Aug. 17, 1965    T. GREWE ETAL    3,201,787
METHOD OF SUPPRESSING NOISE, COMPRESSING BANDWIDTH, AND
EVALUATING RADAR-PICTURE SIGNALS OR SIMILAR
PERIODIC TRAINS OF IMPULSES
Filed July 22, 1960    7 Sheets-Sheet 3

INVENTORS

T.Grewe-T.v.Hauteville-
R.Huss-K.Jekelius-
W.Kaiser-K.Waldau-
H.Wollmann

BY *Robert Harding*
ATTORNEY

Aug. 17, 1965   T. GREWE ETAL   3,201,787
METHOD OF SUPPRESSING NOISE, COMPRESSING BANDWIDTH, AND
EVALUATING RADAR-PICTURE SIGNALS OR SIMILAR
PERIODIC TRAINS OF IMPULSES
Filed July 22, 1960   7 Sheets-Sheet 5

Fig. 8

INVENTORS
T. Grewe-T.v.Hauteville-
R. Huss-K. Jekelius-
W. Kaiser-K. Waldau-
H. Wollmann BY Robert Harding
ATTORNEY

3,201,787
METHOD OF SUPPRESSING NOISE, COMPRESSING BANDWIDTH, AND EVALUATING RADAR-PICTURE SIGNALS OR SIMILAR PERIODIC TRAINS OF IMPULSES
Theodor Grewe, Eckernforde, Tankred von Hauteville, Stuttgart-Degerloch, Rudolph Huss, Esslingen (Neckar)-Zollberg, Kurt Jekelius, Kornwestheim, Wolfgang Kaiser, Stuttgart-Vaihingen, Karl Waldau, Stuttgart, and Heinz Wollmann, Stuttgart-Zuffenhausen, Germany, assignors to International Standard Electric Corporation, New York, N.Y., a corporation of Delaware
Filed July 22, 1960, Ser. No. 44,677
Claims priority, application Germany, July 23, 1959, St 15,331
30 Claims. (Cl. 343—6)

This invention relates to a method of suppressing noise, compressing bandwidth, and evaluating radar-picture signals or similar periodic trains of impulses, by which it is rendered possible to transmit radar images via channels of smaller bandwidths, and at the same time, to take from the radar-picture signal the distance and angular coordinate values of the targets contained therein, in order to feed them to suitable arrangements (such as dead reckoning target computers, flight-path or course tracking recorders, etc.) for further evaluation.

Since the range of radar equipments is limited, and in consideration of the increasing speeds of aircrafts, the available time of radar contact is too short. The visual range of the range-finding apparatus (radar equipments) can only be enlarged in a satisfactory manner by evaluating the indication of distantly arranged radar equipments. In the course of this, however, the simple transmission of the coordinate values of recognized targets appears to be insufficient in many cases, especially in the narrow European area, so that first of all the remote transmission of the complete radar signals appears to be the most important thing to achieve.

The problem of providing a bandwidth compression arises from the desire of saving space on the frequency band and, consequently, of saving costs for the remote transmission of radar signals (pictures). The compression of the band with the aid of a simple low-pass filter appears to be unsuitable due to the reduction of definition which is caused thereby. However, it is possible to achieve a genuine compression of the bandwidth when eliminating the redundancies which are contained in the radar-picture signal. These redundancies lie in the repeated scanning of each target, in the necessary excessive range factor, and in the small target density. Repeated scanning of a target is already known for increasing the range in the monitor by application of noise-reducing integration devices. Otherwise, if the redundancies given by the repeated scanning were eliminated in the case of compression of the bandwidth, it is to be noticed, that this elimination results in a variation of the signal-to-noise ratio of the radar-picture-signal. There must be a compromise between elimination of the redundancies and the signal-to-noise ratio of the transmitted signal.

For solving this problem a storage arrangement is required between the output of the radar apparatus and the input of the transmission section. This arrangement can be embodied as a picture- or line-storage device. The picture-storage device is adapted to store the entire radar-picture signal which has been received during one or more rotations of the antenna, so that the very large storage capacity of about 100,000 picture elements is required. In return, the picture-storage device permits a free choice in selecting the scanning mode, for example, the conversion into a television raster, or the formation of a flight-track. This method, however, is very expensive.

As opposed thereto, a line-storage device is a short-time or temporary storage device in which a storage is effected for the time duration of several radar impulse periods, and only has a storage capacity of several hundred picture elements, quite depending on the desired distance resolution or definition. Into this the data is rapidly stored, and is read-out again at a correspondingly slower rate. The redundancy which is required for this expansion of time resides in the repetition of the same target point in successive radar impulse periods, and in the excessive range sector. A changing of the scanning mode is impossible.

The majority of the line-storage devices used for constricting or compressing the band of radar-picture signals, which have become known up to now, employ cathode-ray tubes. In these tubes the radar-picture signal is written or inscribed by an electron beam in lines on top of each other on to a storage plate, and is read-out again by a second, slower deflected electron beam, which has to extend in the same direction as the first one. Disregarding the difficulty of manufacture and the short lifetime of such tubes it is only possible to let the two electron beams cover each other within admissible limits by sacrificing efficiency. It is another disadvantage that by the utilization of the secondary emission effect the whole equipment becomes very sensitive to temperatures and voltages. Furthermore, the effective storage capacity per picture element is very small (about $0.1 \times 10^{-12}$ Farad) (0.1 pf.) so that only very small signal charges can be stored.

Another conventional method of compressing the band of radar-picture signals operates with a ferrite-core matrix with a connected computer circuit (arithmetic unit) serving as the storage device. In this method especially the complicated circuit arrangement and the low calculating speed are considered as being a disadvantage.

Furthermore, it has already been proposed to use a velocity-modulated storage device, for example, a feedback delay line, as a storage device, whose delay is equal to the duration of periods of the radar-picture signal. In this method above all the rigid periodicity of the storage device has a disadvantageous effect; furthermore the synchronization presents certain difficulties. In some cases especially when combining radar-picture signals of several apparatus it is desirable, to represent only a limited number of the targets (aircrafts etc.). These are the targets which are the most interesting ones. In those cases it is sufficient to transmit only these targets. In order to do so, however, the coordinate values thereof must be known. These target coordinates may also be fed to target-tracking devices, or to similar equipments. In the storage devices which are used for the compression of the band of radar-picture signals, and which have become known hitherto, it is only possible to a certain extent, and under considerable difficulties, to derive the co-ordinate values of the existing targets from the given radar-picture signals.

It is one object of the present invention to provide a simple and easily performable method of suppressing the noise and of compressing the band of radar-picture signals, or of similar periodical trains of impulses, in which it is also possible to derive the coordinate values of the given targets from the given radar-picture signal in a simple manner, and with the maximum possible accuracy.

A feature of this invention is a system for noise suppression, bandwidth compression and evaluation of radar pulse-type signals for transmission over channels of smaller bandwidth which comprises a radar transmitter including a rotating antenna for transmitting pulse-type signals and receiving back echoes of radar pulses, a plurality of storage elements, each storage element representing a discrete quantity, the number of storage elements being limited in accordance with the probability of accuracy of the evaluation. There is provided a write-in pulse distributor, a plurality of gating means, means coupling the pulse-type signals and the output of the pulse distributor to the plurality of gating means and means coupling the output of the gating means to the storage elements whereby the pulse-type signals are sequentially written in to said storage elements at a first frequency determined by the pulse distributor and means to read out the stored signals from the storage elements at a second frequency.

Accordingly, with the aid of the aforementioned method it is possible to perform a very exact assignment of certain distance elements to certain storage elements, so that, as will be mentioned hereinafter, considerable advantages will result with respect to the further evaluation of the compressed radar-picture signals, and to the feeding of auxiliary signals into the original radar-picture.

The above-mentioned method according to the invention will be best understood, by reference to the following description of an embodiment taken in conjunction with the accompanying drawings, wherein:

FIG. 8 shows the complete block diagram of a system operating in accordance with the invention both for the suppression of noise and the compression of bandwidths of radar-picture signals.

The large bandwith of the surveillance radar system is due to several causes which are based on the kind of the picture production:

A directional beam antenna with the antenna beam width $\beta(1-2°)$ rotates with the frequency $f$ (0.1 to 0.5 cycles). In the course of this, and at time intervals of $t$, respectively a transmission impulse of the width $\tau$ and with the output N is transmitted. The echo as reflected by the target, arrives again at the antenna after the time $\alpha t$, and is indicated. The interpulse spacing $t$ must now be chosen thus that the transmission impulse can travel the way to the target and back during this time. The range of the radar equipment, which is determined by the signal-to-noise ratio of the echo impulse, accordingly determines the magnitude of $t$. However, since particularly large targets beyond the actual range of the equipment still might reflect a useful echo impulse, $t$ has to be chosen somewhat larger in order to avoid ambiguities by echo impulses resulting from these targets outside the normal range. For example, in the case of a range of the radar apparatus of 150 km. (about 93 miles) $t$ may be somewhat between 1.25 and 1.5 ms. When stating, in addition thereto, the desired distance resolution or definition, then the transmission pulse width $\tau$ will be immediately obtained therefrom and, consequently, also the bandwidth of the radar-picture signal. The angular resolution is given by the value of $\beta$, which is the minimum obtainable value from the technical point of view. The antenna rotation frequency $f$, however, may not be chosen so high that the angle $\beta$ is swept during the time $t$, but must be substantially lower, so that several echo pulses are reflected by one target. This is necessary in order to improve the signal-to-noise ratio, respectively in order to save transmission energy in the case of a constant signal-to-noise ratio.

There may be achieved a saving of bandwidth for the transmission of the radar-picture signal when transmitting only one impulse instead of $n$ impulses per target, in other words, when transmitting only one of $n$ transmission periods (radial lines), and when this is performed in a correspondingly slower manner. Instead of transmitting a sequence of target points consisting of $n$ juxtaposed points, in which case the centre of this succession of points exactly corresponds to the actual destination, only one point is transmitted whose phase-displacement or shift angle varies between $$+\frac{\beta}{2} \text{ and } -\frac{\beta}{2}$$

on account of the kind of recording or plotting in polar-coordinates. However, the reduction of the angular resolution caused thereby, is a slight one, since it is never easy for the observation operator to ascertain exactly the centre of the point sequence in the case of the transmission of all of the $n$ echo impulses.

Of course, the reduction of the $n$ echo impulses to only one echo impulse may not be carried out in such a way that only one period of a succession of $n$ transmission periods is faded out, and is transmitted in a correspondingly slower fashion. This would cause a substantial deterioration of the signal-to-noise ratio of the radar-picture signal, because no use is made of the coherence of the echo impulses. In any case, therefore, and prior to the transmission, a storing has to be carried out in analogy with the storing on the phosphor screen of the reproduction tube. Accordingly, on principle, a noise-suppressed radar-picture transmission system operates as follows:

The radar-picture signal originating with the master equipment is "written" into a storage arrangement, and is thereafter "read-out" again in a slower fashion, i.e. in a way that always several transmission periods or radial lines are combined to one period or line respectively. This signal is then transmitted.

Figure 1:
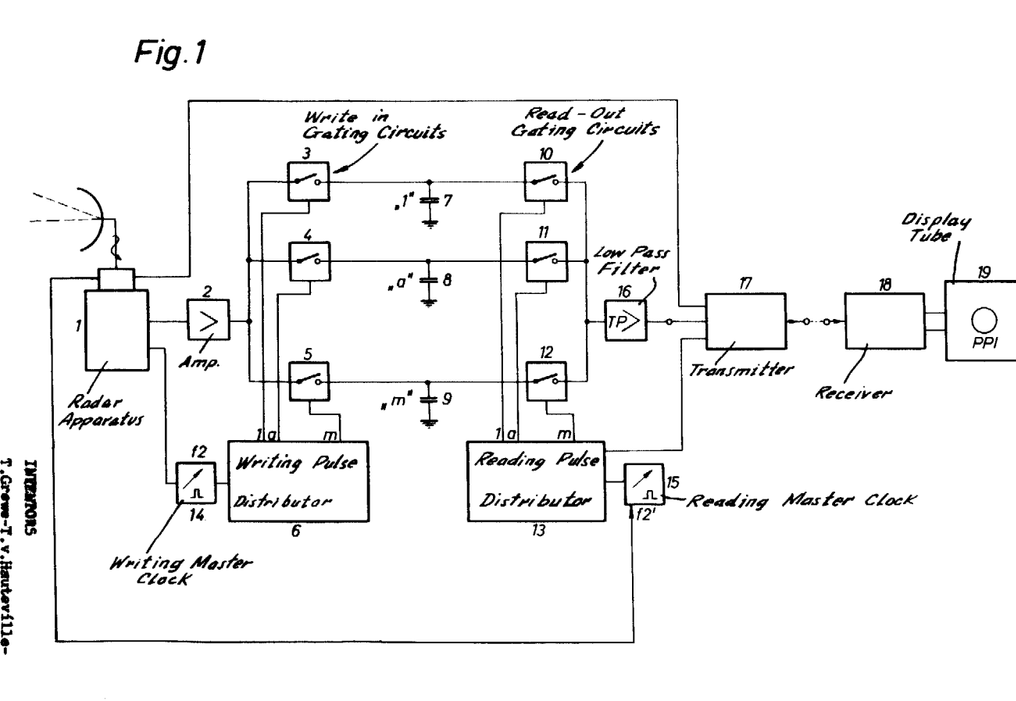
FIG. 1 shows the basic circuit diagram of a simple system, operating in accordance with the inventive method of suppressing noises and of compressing the bandwidths of radar-picture signals.

First of all the method according to the invention will now be explained with reference to the brief basic circuit diagram shown in FIG. 1. From the output of the radar apparatus 1 and, via an amplifier 2, the radar-picture signal is simultaneously fed to the inputs of $m$ writing- or storing-gating circuits (of which, however, only three are shown in the drawings, i.e. 3, 4 and 5). The outputs of these normally opened gating circuits are connected with $m$ storage capacitors (of which only the ones indicated by the reference numerals 7, 8 and 9 are shown). To each of these storage capacitors a certain time section is assigned in the radar-picture signal and, consequently, a certain distance section within the sector which is swept over by the radar equipment at a predetermined time position. By the transmission impulse of the radar apparatus, which appears with a repetition rate having the frequency of 400 cycles, the writing master clock 14 is started, whose output impulses are then distributed via the writing-pulse distributor 6 in such a way to the writing-gating circuits 3, 4 and 5 that successively each of the gating circuits is opened for a certain time duration. During this time the echo impulses contained in the radar-picture signal are stored in the corresponding capacitor.

Figures 2A, 2B:
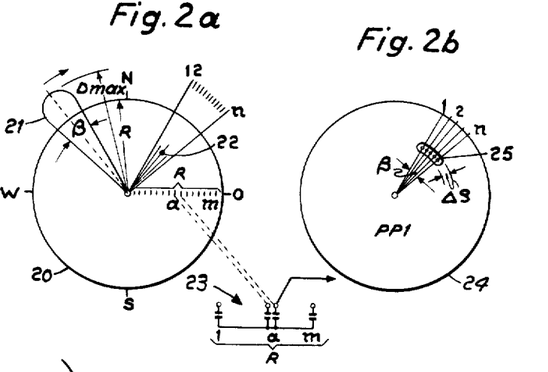
FIGS. 2a—2c show the basic representation of a target in polar coordinates in nature, on a PPI-screen prior to the band compression, and on a PPI-screen after the band compression.
Figure 2C:
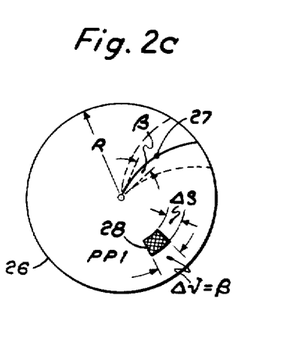

The distribution of the echo impulses to the individual storage capacitors is shown in FIG. 2a. If the number of storage capacitors $m$, for example, amounts to 256 (for reasons to be explained hereinafter) then the radius R of the circular area which is swept by the lobe of the radar apparatus, is divided into 256 distance sections, each of which is assigned to one storage capacitor. Thus, if the radiation lobe 21 (FIG. 2a) of the radar apparatus, for example, just sweeps the radius R, then the impulses reflected by targets within this radius, are successivly stored in the capacitors 1 to $m=256$ of the capacitor group 23. If now the next radar-impulse sequence, that is, the next sector swept by the radar apparatus (radiation lobe) is stored again in the described manner in the capacitors 1 to $m=256$, then the target impulses in the storage capacitors are linearly added, whereas the noise is partly reduced to an average value. In this way it is possible to achieve a certain noise suppression of the radar-picture signal. Of course, it is possible to add a random number of radar impulse periods in the capacitors. The number $n$ thereof is only determined by the desired resolution of the image 26, which is again read later on, because the originally neighboring radius vectors are now stored on top of each other, and cannot be separated again. A target 25, which has a certain extension of width, and which has been hit several times by radar impulses, will only be represented again as a spot-shaped target 27 after the addition of the corresponding signal periods.

The angular resolution $s$, preferably in accordance with the distance resolution $s$, which depends on the number of the storage capacitors $m$, is chosen thus that at the reproduction on the slave-monitor, as represented by the diagram 26 in FIG. 2c, and with respect to $R/2$, the width of one raster element 28 is almost equal to its length. In order to enable the read-out of the signal stored in the capacitors, and to reproduce them, the capacitors are connected with a second group of gating circuits (of which only the three indicated by the reference numerals 10, 11 and 12 are shown in FIG. 1). These read-out gating circuits, similar to the writing-gating circuits, and via the reading-pulse distributor 13, are successively opened (or blocked) by the reading master-clock 15 at a substantially lower frequency than the writing-gating circuits, so that the signal called-up from the storage capacitor, may be taken off behind the low-pass filter 16. By this slower interrogation of the storage capacitors a bandwidth compression of the original radar signal is now effected, the extent of which is due to the ratio between the writing frequency of the master-clock 14 and the reading frequency of the master-clock 15.

In order to achieve a further enlargement of the bandwidth-compression factor it is possible to perform a very rapid reading of the storage capacitors as long as they do not contain any stored target impulses and, upon appearance of the first stored impulse, to switch them over to the normal low reading frequency, as long as stored impulses appear.

The radar-picture signal is then transferred from the low-pass amplifier and filter 16 to the transmission section by means of the transmitter 17, at the end of which transmission it is taken off by the receiver 18 and is fed to the slave-PPI instrument 19 or any other suitable evaluating equipment. The slave PPI-instrument must be synchronized by the master-PPI. On account of this and together with both the radar-picture signal and the antenna rotation signal, a synchronizing signal is transmitted. This synchronizing signal is derived from the reading clock pulse or rhythm and is transmitted at the same frequency as the radar-picture signals. Preferably, the first impulse of each train of reading impulses is used as the synchronizing signal, that is, at the beginning of each new reading cycle of the capacitor-storage device one synchronizing impulse is transmitted.

To each storage element a certain distance range is assigned. Due to this fact auxiliary signals such as test points, marking lines, maps etc. can be easily inserted into the radar-picture signal in that corresponding signals (impulses) are fed directly to the storage elements, in whose associated distance element the desired marking is supposed to be lying.

Figure 3:
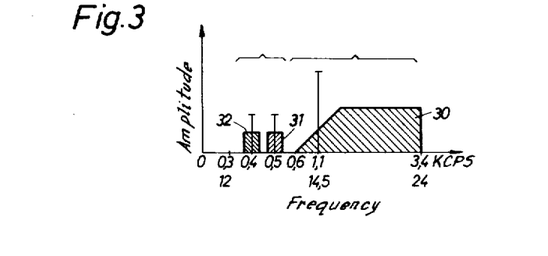
FIG. 3 shows the amplitude characteristic of the radar-picture signal compressed in the course of the carrier-frequency method.

FIG. 3 shows the frequency (or amplitude) characteristic of the compressed radar-picture signal in the transmission channel. In the diagram, the abscissa represents frequency and the ordinate represents the amplitude of the signals. The compressed radar-picture signal 30 is transmitted in accordance with the carrier-frequency method with a residual sideband modulation. It is advisable to effect no suppression of the carrier wave, because the radar-picture signal contains a direct-voltage component (direct-current component, background brightness), which has to be transmitted as well. When performing the transmission over a telephone channel, the carrier wave for the radar-picture has a frequency of about 1 kc./s. For the transmission of the antenna rotation two phases of a rotary (or rotating) field system 31 and 32, coupled to the antenna, are transmitted in accordance with the double-sideband method with the carrier frequencies of 400 and 500 cycles respectively, so that the rotary (or rotation) movement of the inscribing electron beam in the picture tube of the slave PPI-instrument (display-unit, indicator) is in complete synchronism with the rotation of the radar antenna. Any irregularities which may be caused by the wind, or the like, and which are likely to affect the rotation of the antenna, are exactly transmitted as well. FIG. 3 has two indicators on the abscissa to show the frequencies for two possible transmission channels, mainly for a telephone channel with a bandwidth 0.3 to 3.4 kc./s., and for a radio channel with a bandwidth from 12 to 24 kc./s. The diagram shows the different frequencies needed in both cases. The area 30 represents the compressed radar picture signal.

The transmission of the phases of a rotary field system, however, presents certain difficulties and requires two additional carrier waves. In view of this it may appear to be more appropriate to transmit the antenna rotation with the aid of an impulse method which, at the same time, takes over the synchronization of certain equipments at the receiving end, as will be described in detail hereinafter with reference to FIG. 8.

With respect to the transmission of the antenna rotation, of course, it is also possible to transmit a signal, which is in proportion thereto, in the same channel as the radar-picture signal which is compressed in its frequency band, but to transmit it in a different time-amplitude-, or frequency relation with respect to the slave-PPI instrument. Hitherto chiefly the following methods were used for transmitting the antenna rotation:

(1) Transmission of two phases of a rotary field system.

(2) Transmission of impulses derived from an impulse generator, for example, a tone wheel, coupled to the antenna.

However, it is the disadvantage of these two methods that they are very expensive and require an additional transmission channel. In order to simplify the transmission of the antenna rotation the readout scanning is now controlled in a way that the spacing between two synchronizing impulses corresponds to the further rotation of the antenna by a certain or predetermined angular amount. Accordingly, in the case of a slowly rotating antenna the storage device is seldom subjected to a readout, and correspondingly more frequently in the case of an increasing number of rotations of the antenna. In the course of this the readout master-clock is triggered (or started) by signals resulting from the antenna rotation, namely angular marks, which are, for example, in phase with the north mark and, subsequently to the readout of the last storage device, or respectively if the non-operative time is not sufficiently long enough, is stopped again by the next successive angular mark. In order to achieve this, the readout speed has to be adapted to the maximum angular velocity of the antenna. In the case of a slower rotation of the antenna intervals (non-operative times) will appear between the stoppage and the restarting of the readout master-clock. If the master-clock is stopped prematurely, then an impulse or a group of impulses for marking the suppressed area is faded into the transmission channel of the radar-picture signal. On the screen of the slave-PPI instrument the image is then limited at those points at which it is not completely represented, by a special boundary line (for example double or triple line) quite depending on the faded-in group of impulses. This additional impulse or group of impulses is also faded into the transmission channel in cases where the master-clock is stopped in the ordinary way. At the receiving end a generator is then readjusted in a way that the $n$th clock-pulse of the master-clock or generator is synchronized in a fixed-phase manner with the faded-in impulse (or group of impulses), ($n$ indicates the number of storage elements). This generator at the receiving end then oscillates at the same frequency as the reading-pulse generator at the transmitting end, so that the delivered signal can be keyed therewith, and can be regenerated, in other words, can be freed from the overshoots as appearing in the transmission channel. Accordingly, this auxiliary generator scans the incoming signal, which is cut off at the impulse edges, with the aid of narrow impulses. These narrow scanning values (signals) are then enlarged again with the aid of suitable arrangements.

A further possibility for synchronizing the generator to the receiving end is given in that a frequency divider of a division ratio $n:1$, which is connected to the output of the continuously oscillating generator, is restored to zero by the synchronizing impulse (starting of the reading-pulse generator), so that the $n^{th}$ impulse can be compared with the transmitted stop impulse in a phase comparator for the purpose of effecting a readjustment of the generator. Finally, it is still possible to synchronize the auxiliary generator at the receiving end in that the reading pulse generator is synchronized in a fixed-phase manner with the carrier-wave generator of the transmission equipment, which, in turn, synchronizes the auxiliary generator at the receiving end.

In order to achieve a regeneration of the transmitted radar-picture signal a logical circuit may be provided at the receiving end, which is controlled by the regulated clock-pulse generator and by the incoming radar-picture signal. With the aid of this circuit it is then possible to restore or regenerate the original sequence of impulses (ahead of the transmission section or channel). The logical circuit arrangement consists of a multiple coincidence network in which the signals are compared with one another during the second, third, or during several successively following intervals.

The non-operative time previously referred to is the time between the end of a first read-out and the beginning of a second following read-out. If the master clock is stopped prematurely, that is before the last storage element is read out, then an impulse or group of impulses for marking the suppressed area (which is the area belonging to the storage elements which were not read out on account of the next starting impulse) is inserted into the transmission channel. The line surrounding the suppressed area is the special boundary line. The term "overshoots" refers to distortions which are likely to occur during the transmission in the transmission channel.

Figure 4:
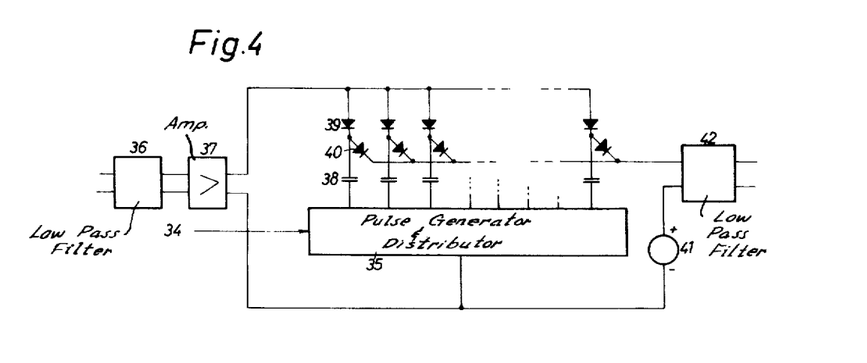
FIG. 4 is the block diagram of a circuit arrangement for writing-in and reading-out the radar-picture signals in a number of storage capacitors.

FIG. 4 shows the basic circuit diagram of a capacitor-storage device with the writing-in and read-out arrangement according to the invention. The radar-picture signal to be stored is fed to the amplifier 37 via the low-pass filter 36. The impulse-generator and distributor 35 is started by the transmission impulse over the line 34, and successively transmits impulses to its output lines connected with the storage condensers 38, which impulses are polarized in such a way that they unblock or open the diodes 39, but block or close the diodes 40, so that the radar-picture signal, for the duration of one impulse, is fed into the respective storage capacitor at which an impulse is just appearing. Since the impulse distributor is appropriately composed of bistable trigger circuits, it is suitable to choose for the number of outputs of the impulse distributor, that is, for the number of storage capacitors, if possible, a dual number, for example 256. With the aid of such a number of storage elements a sufficiently large distance resolution will then result also in the case of normal surveillance-radar systems. For reading the chargings which are summed-up in the storage capacitors, impulses are produced with an opposite polarity and with a correspondingly lower repetition rate of frequency, which likewise appear successively at the outputs of the distributor, but now block the diodes 39, and unblock the diodes 40, so that the chargings in the individual capacitors, with the assistance of the source of biasing potential 41, are discharged successively towards the output circuit 42 which, preferably, is a low-pass filter. In order to ensure a linear storage characteristic, in other words, to safeguard a linear summing-up in the storage elements, the amplifier 37 has a high impedance output and the circuit 42 has a low impedance input.

Since the readout from the capacitors, and, consequently, the recording on the slave-PPI instrument, to which the signal is transmitted, is performed very slowly as opposed to the writing-in (storing), and since the antenna rotation is a constant or continuous one, and because the transmission also is continuous and, consequently, the angular deflection in the slave-PPI instrument is likewise performed continuously, a spiral-shaped distortion of the individual radial lines will result on the screen of the slave-PPI instrument as shown in diagram 26 of FIG. 2.

Figure 5:
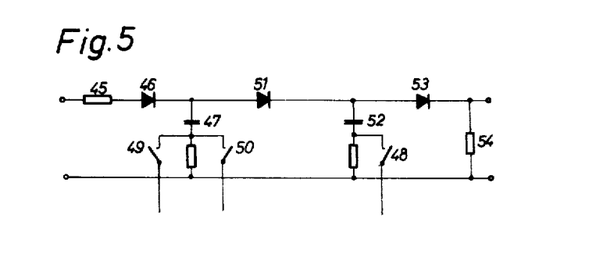
FIG. 5 shows a circuit arrangement according to FIG. 4 for restoring the written (stored) radar-picture signal in order to avoid angular distortions.

FIG. 5 shows an enlarged modification of the storage arrangement of FIGURE 4, with the aid of which it is possible to avoid the aforementioned distortion. For reasons of simplicity, however, the circuit arrangement is only shown with respect to one storage element. The complete circuit arrangement then consists of 256 correspondingly parallel-connected arrangements. 47 indicates the storage device into which an impulse is fed-in via the switch 49 which, just like the switches 50 and 48, is supposed to represent the impulse distributor, and via the internal resistor (resistance) 45 of the preceding amplifier, and the diode 46, a short section of the radar-picture signal is stored. Instead of discharging the capacitors 47 (not shown with the exception of one) slowly and successively as described before, the chargings of these capacitors, by impulses fed-in via the switches 50, are simultaneously stored into a second group of capacitors 52 (of which likewise only one is shown), from which they are then, by the impulses fed-in via the switches 48, read-out successively, but somewhat quicker than in the circuit arrangement according to FIG. 4. FIGURE 5 merely represents a modification of parts of FIGURE 4 (only one storage element) with the aid of which it is possible to avoid the disadvantages previously enumerated. In FIGURES 4 and 5, the circuit elements 38 and 47 as well as 39 and 46 approximately correspond to one another; 45 indicates a part of the element 37 and reference numeral 49 indicates a contact provided in the distributor 35.

Figure 6:
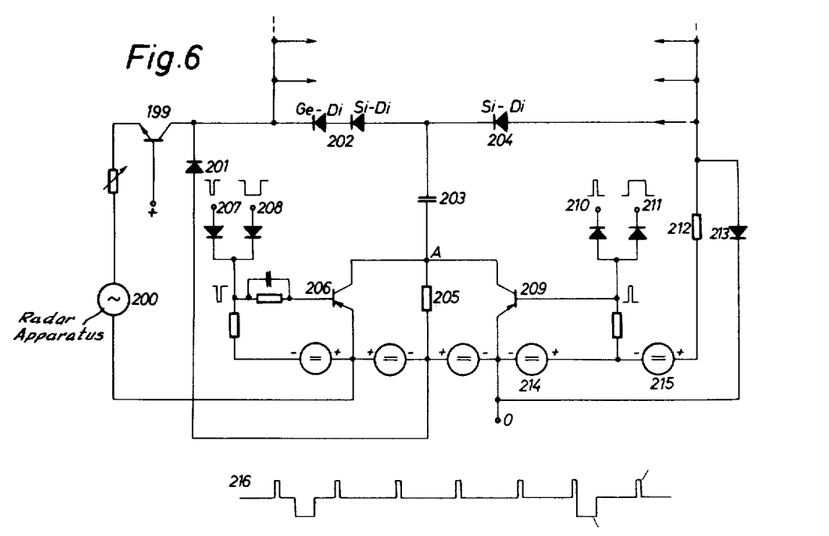
FIG. 6 shows a detailed circuit diagram of a circuit arrangement according to FIG. 4.
Figure 10:
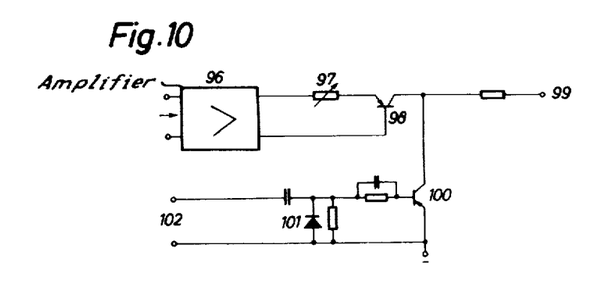
FIG. 10 shows an example of embodiment of a circuit arrangement for keying the radar-picture signal at the input of the storage arrangement.

FIG. 6 shows the detailed circuit diagram of a writing-in and readout arrangement for a storage capacitor employed within a capacitor storage device according to the invention. The circuit elements between the overshoot diode 201 and the read-out resistor 212, with the exception of the source of biasing potential 214, are provided once for each storage capacitor, that is, for example, 256 times on the whole. The radar-picture signal to be stored, which originates with the source of radar signals 200 (radar apparatus) is fed or applied via a transistor-base stage 199, the circuitry and mode of operation of which will be described in detail hereinafter with reference to FIG. 10, and via the amplitude-limiting overshoot diode 201 to the diode 202. Two trains of impulses generated by the writing pulse generator are combined in the coincidence circuit consisting of the diodes 207 and 208. The writing pulse resulting therefrom is applied via the transistor 206, with a positive polarity to the lower plate of the storage capacitor 203, so that the diodes 202 are unblocked, and the radar-picture signal is stored into the capacitor 203 for the duration of this writing impulse. Since the diode 202, in order to avoid a "crosstalk" between the individual storage capacitors, must have a high as possible blocking resistance, but is supposed, on the other hand, to respond as rapidly as possible to the switching impulses, a series connection consisting of one germanium and one silicon diode has been chosen as a compromise, because a germanium diode operates very rapidly, and a silicon diode achieves a high blocking-resistance value.

Two trains of impulses generated by the reading-pulse generator are combined in the coincidence circuit composed of the diode 210 and 211. The thus resulting reading impulse is applied, via the transistor 209, with a negative polarity to the lower plate of the storage capacitor 203, so that the diode 204 is unblocked, and the capacitor is discharged via the readout resistor 212, across which there will then appear a voltage drop in proportion to the charge. In order to ensure a complete and quick discharge of the capacitor, the readout resistor is biased by the source of voltage 215, so that the diode 213 is discharged towards a point lying lower with respect to potential. The diagram 216 in FIG. 6 shows the voltage course at the point A, that is, at the lower plate of the storage capacitor, in case it is being discharged again after five storing operations. The pulses above the horizontal reference represent the writing pulses and the pulses below represent the reading pulses.

Figure 7:
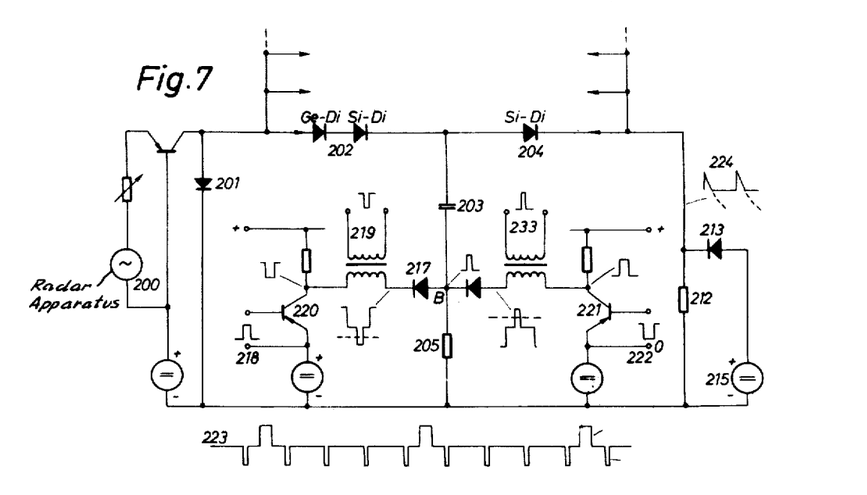
FIG. 7 shows a modified example of embodiment of a circuit arrangement according to FIG. 6.

FIG. 7 shows a modification of the circuit arrangement according to FIG. 6. With the exception of the coincidence circuits and the lead-in of the writing and reading pulses to the storage capacitor, this arrangement is identical with that of FIG. 6. Corresponding circuit elements are indicated by the same reference numerals as those in FIG. 6. The two trains of impulses of the writing-pulse generator are combined in the coincidence circuit, composed of the transformer 219 and of the diode 217, and are fed to the lower plate of the storage capacitor 203, so that the group of diodes 202, again consisting of a series connection of a germanium and of a silicon diode, is unblocked for the duration of the resulting impulse, and the radar-picture signal is stored. The generation of the reading impulse and the discharge via the readout resistor 212 is effected in a similar way as already described hereinbefore with reference to FIG. 6. The diagram 223 in FIG. 7 similar to the corresponding diagram in FIG. 6, shows the voltage course at point B, that is, at the lower plate of the storage capacitor, in case it is discharged again after four storing operations. Also in the diagram 223, the pulses above the horizontal reference represent the reading pulses and the pulses below represent the writing pulses.

FIG. 8 now shows the complete block diagram of a system operating in accordance with the inventive method of suppressing noise and compressing the bandwidth of radar-picture signals. From the radar apparatus 55 the radar-picture signal is fed via the low-pass filter 56, via the amplifier 57, and via the keying stage 58 which is controlled by the writing impulse, to the capacitor-storage device 59. Both the construction and the purpose of the end or final amplifier stage 57 and of the keying stage 58 will be described in detail hereinafter with reference to FIG. 10. The train of impulses adapted to control the writing into the storage device 59 is produced by the quartz-controlled generator 61 with the subsequently arranged limiter stage 62. The generator 61 oscillates permanently. The train of impulses produced thereby, however, is only transferred via the 10:1-divider 64 to the writing-impulse distributor 60 if the interconnected gating circuit 63 is opened or unblocked by the trigger impulse coming from the radar apparatus and coinciding with the transmission impulse at the beginning of each period of radar impulses. In accordance with the chosen storing frequency the individual storage elements (storage capacitors) within the storage device 59 are thus successively connected to the output of the stage 58 by the control impulses coming from the writing-impulse distributor 60, and in this way one radar-impulse period after the other is stored.

For the reading of the stored radar-picture signal the reading impulses coming from the impulse distributor 65 are used. They are likewise derived from the train of impulses produced by the control-impulse generator 61, 62 via an impulse-frequency divider 66 which is capable of being adjusted at a ratio of 10:1 to 100:1. However, in order to achieve a better synchronism with the slave-PPI instrument, and for the compensation or indication of strong variations of the antenna rotation, the readout scanning is controlled via a corresponding arrangement 69 by an angular signal derived from the radar antenna. This angular signal consists of a train of impulses in which each impulse corresponds to a progress in the antenna rotation by, for example, 0.5°. The angular signal controls the gating circuit 67, which feeds the train of reading impulses to the reading-impulse distributor 65, via gating circuit 70, which is also controlled by the train of reading impulses from the divider 66, and via a further divider 71 and a flip-flop stage 72. Via the gating circuit 70, which is controlled by the angular signal, a synchronism between the antenna rotation and the read-out of the storage device is thus achieved. After the last (256th) capacitor of the storage device 59 has been read, a stop impulse is transmitted by the last flip-flop stage of the impulse distributor 65, which stop impulse then blocks the gating circuit 67 via the stage 68, and transmits an impulse to the reading-impulse distributor 65, by which the latter is switched back to the initial position. At the beginning of a new storage-readout operation the gating circuit 67 is then unblocked again at a time position which is determined by the angular signal and the dividing ratio of the divider stages 66 and 71. The divider 71 has a fixed dividing ratio of e.g. 16:1, so that the repetition rate of frequency of the storage readout operations is determined by the divider 66; the beginning of each particular storage readout operation, however, is determined by one impulse of the angular signal. If, as already mentioned hereinbefore, on account of considerable variations of the antenna rotation, a new starting impulse is transmitted to the gating circuit before the readout of the storage has been completely finished, then a marking impulse is transmitted by the coincidence device 68 to the output stage 79, and is faded into the noise-suppressed radar signal which is compressed with regard to the frequency band occupied, and which has been readout of the storage device and is supposed to be transmitted. This marking impulse can also be faded into the radar-picture signal to be transmitted, if the impulse distributor has performed its operation already once, in other words, if already one reading of the storage device has been completed. From the discharge circuit 76, which is arranged subsequently to the storage device 59, the radar-picture signal as derived from the discharge resistor 212 (FIGS. 6 and 7), and in which the individual impulses—due to the discharge circuit—still have the shape of sawteeth, is fed to a PAM-demodulator 77. In this PAM-demodulator 77, which is synchronized by the reading impulse derived after the gating circuit 67, the sawtooth-shaped impulses are reconverted into rectangular amplitude-modulated impulses in accordance with the charge of the storage capacitor from which they were read. This PAM-signal is then fed to the output and mixer stage 79 via the Compander 78 which is likewise synchronized by the reading impulse, and to the transmission section.

Via the already mentioned arrangement for the conversion of the rotation signals 69 as delivered by the radar apparatus (antenna) two further trains of impulses, in which the individual impulses correspond to the north mark or to several angular marks (for example, one angular mark every 10°) are fed to the two coincidence circuits 74 and 75. In these coincidence circuits, controlled by the train of reading impulses via the divider 71, impulses are cut out of these two rotation signals by the coincidence circuit 73, which then extend synchronously with the reading impulses and, consequently, with the impulses in the transmitted radar-picture signal as read from the storage device. These impulses, which are faded into the transmitted radar-picture signal in the mixer stage 79, may also be taken off at the point 81 in order to be transmitted separately. The synchronous impulse, which is produced at the beginning of each reading scan, is fed, via the coincidence circuit 73 and the push-pull stage 80, to the points 82 and 83, at which this synchronous impulse is then available with both polarities, in order to be faded into the radar-picture signal which is compressed and taken off at the points 84 or 85, in the transmission equipment of the transmission section. The frequency-band compressed radar-picture signal is then taken off at the points 84 and 85 after the output and mixer stage 79, with the faded-in north mark, and the angular marks with the desired polarity.

Figure 9:
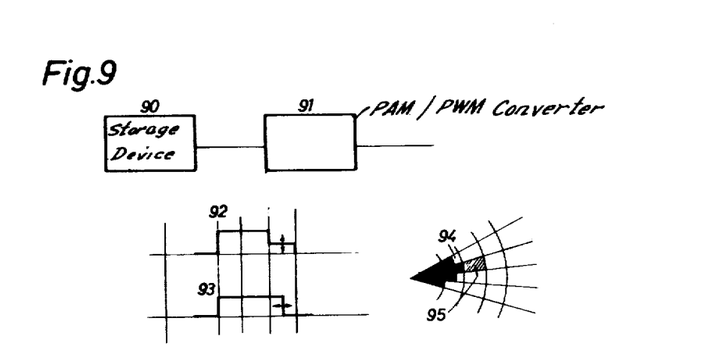
FIG. 9 shows one block diagram and two further diagrams for explaining the PAM/PWM (pulse-amplitude modulation/pulse-width modulation) conversion at the output of the storage arrangement.

If a target complex, either completely or with one edge, is just on the boundary between two distance sections, then this means to imply that the associated reflected impulse per line is stored in the storage capacitors assigned to these two distance sections. On the screen of the slave PPI instrument the limitation of a target complex, terminating for example in the centre of a distance section, is then not formed by a sharp limitation of the light spot in the centre of the raster element assigned to this distance section, but the entire raster element is illuminated, if only with half the usual intensity. If, however, as is shown in FIG. 9, a PAM/PWM (pulse-amplitude modulation/pulse-width modulation) converter is inserted after the output of the capacitor-storage device 90, then this disadvantage can be avoided. If, as already assumed hereinbefore, the boundary of a target complex is lying in the centre of a distance section then, because the last storage capacitor was only half filled, the train of impulses 92 will result at the output of the storage device. If this train of impulses would be fed to the slave-PPI instrument, then the raster element 95 which is approximately assigned to the last distance section, as indicated by the hatch-lined portions, would only be illuminated with half the intensity, because the inscribing beam would be keyed less strongly by the last impulse. However, if the group of impulses is led via a PAM/PWM-converter 91, then the train of impulses 93 will result at the output thereof. In this the last impulse has the same amplitude as the preceding ones, but only half the width. The associated raster element on the slave-PPI instrument, for example, 94, is now illuminated with the full intensity, but only half. The representation of the screen now corresponds again most extensively to the actual extension of the target or target complex respectively. Assuming that a target which has been picked up or detected by the radar equipment is moving, then it will be easily recognized that the target appears as an individual and sharply limited picture point on the radar screen, because the reflected energy is completely stored in one single element in accordance with the distance section in which the target is positioned. However, if the target moves from one distance section into the next section then, at this transition, the reflected energy is distributed to both of the neighboring storage elements. On the radar screen the target will then appear at an enlarged scale but with a smaller luminous density. Hence, in this case, one could easily have the impression of there being a greater target than the one actually existing.

In order to avoid this enlargement of the target signal or point on the radar screen, there is carried out the conversion from PAM to PWM. As may be seen in FIGURE 9, this PAM-to-PWM conversion is effecting at the trailing edge of the target pulse. The example previously described in which the target complex terminates in the center of the distance section provides a simplified representation as shown in the drawings.

FIG. 10 again shows the input-circuit arrangement of the capacitor-storage device but in more detailed representation. Via the amplifier 96 the radar-signal is fed to a transistor-base stage 98 which has a high output resistance and serves as a source of constant current, by which the subsequently arranged storage capacitors are quickly charged with a constant current upon appearance of reflected impulses in the radar-picture signal. The amplitude of this current can be adjusted with the aid of the resistor 97. By the action of the transistor 100 the point 99 and, consequently, the radar-picture signal, are short-circuited with respect to negative potential always when a switchover is performed in the storage device between two capacitors. In that case it is not necessary to demand such high requirements from the time accuracy of the switchover impulses, and it is also avoided that the radar-picture signal is simultaneously stored in two capacitors during the switching-over period. The switching transistor 100 is controlled via a suitable train of impulses which is derived from the writing-pulse generator, and is applied via the terminals 102. By the clamping diode 101 the train of impulses is staggered with respect to its amplitude in accordance with the operating voltage of the transistor 100.

Figure 11:
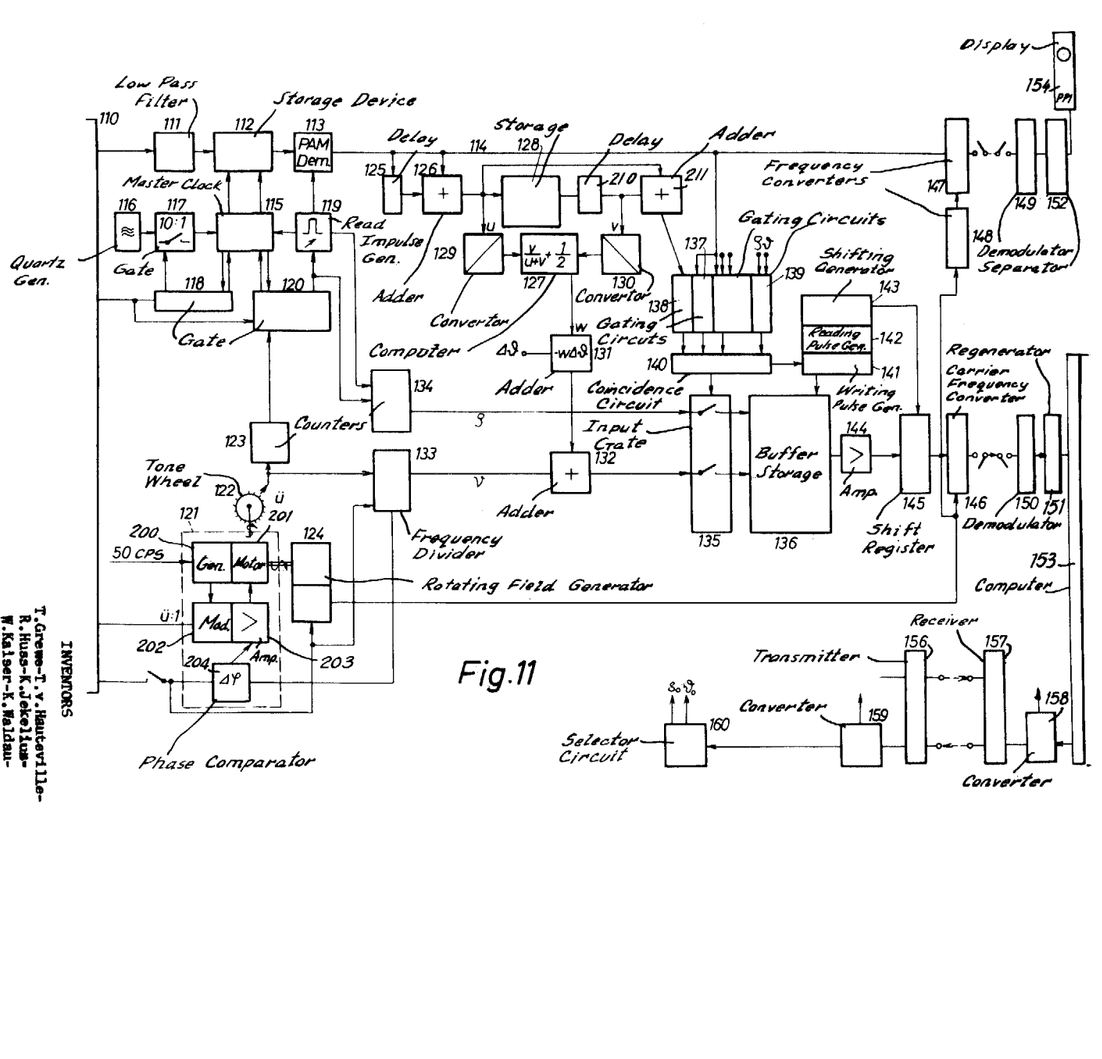
FIG. 11 shows a block diagram relating to a system according to FIG. 8, from which at the same time the coordinate values of the existing targets, encoded in a digital fashion, can be taken.

FIG. 11 shows the complete block diagram of an enlarged system used for suppressing noise and for compressing bandwidth of radar-picture signals. The video signal of the radar apparatus 110, via the low-pass filter 111 which is tuned to the radar apparatus, and contains a limiting amplifier, is fed to the capacitor-storage device 112 and, after the read-out of the information, the video signal is applied, via a PAM-demodulator 113, to the output 114 of the frequency-band compression system.

The capacitor-storage device 112 is controlled by a master-clock (timing device) 115 whose writing-impulse portion is controlled by a quartz generator 116, via a frequency divider, with an electronic gating circuit 117. The writing-pulse generator is started by the transmission impulse of the radar apparatus 110, and is stopped and reset after reaching the counting (counter) position 256, via the gating circuit 118. The reading-pulse generator 119, whose frequency is equal to the rhythm (the time required to readout each storage element) of the information which is compressed with respect to the frequency band, by which also the computing operations are carried out, is controlled in the same way via the gating circuit 120.

The rotation signals (electric waves $u:1$ and $1:1$ or north mark respectively) where the symbol "$u$" stands for transmission ratio which are derived from the radar antenna, are received by a servo system 121. The servo system 121 includes a generator 200 which is driven by a 50 c.p.s. signal as shown. The motor 201 of servo system 121 is coupled to the generator 200. The rotation signal $u:1$ is coupled to a modulator 202 to which is also coupled the output of the generator 200. An amplifier 203 has its output fed to the motor 201. A phase comparator 204 in the servo system 121 has its output coupled to the amplifier 203. The function of the phase comparator 204 is to compare the north mark with an output from the frequency divider 133. On the shaft of this servo system a tone wheel 122 is arranged, whose impulse or rhythm corresponds to one rotation of the antenna by e.g. 0.1°. Via a counter 123 corresponding to the half width lobe, i.e. half beam power, in units of one tenth of a degree, the controlling of the reading-impulse generator is released via the gating circuit 120, so that only respectively one readout scanning of the storage is effected per half width of the antenna beam. In this way the frequency of the readout operation becomes dependent upon the rotation velocity or rotational speed of the radar antenna, and in view of this the reading-impulse generator 119 should be capable of being adjusted in a step-by-step manner, in order to enable a correspondingly better utilization of the transmission capacity of the transmission lines leading to the slave station at a slowed-down antenna rotation. By applying the transmission impulse of the radar apparatus to the gating circuit 120 a certain synchronism is achieved between the writing and the reading process. In addition thereto a rotating-field generator 124 is seated on the shaft of the servo system. The data of this generator (transmission ratio, north mark) are adapted to the requirements of the slave-PPI instrument.

frequency, whereby timely successive target impulses are

The capacitor-storage device is operated as usual, but with a limited signal current, that is, via an electronic distributor which is synchronized by the radar-impulse distributed via gating circuits to capacitors which are arranged spatially next to each other. Accordingly, a predetermined or certain distance element ($\Delta s$) is assigned to each capacitor. In the course of several impulse periods the energy reflected by a target is added as a charge in the same capacitor, and is discharged after a certain time, which corresponds to the sweeping effected by the antenna lobe which is about 1° wide, via a second freely running electronic distributor, and via gating circuits. The amplitude of this discharge impulse corresponds to the stored target charge, and is in proportion to the number of target impulses received between successively following readout-scanning operations.

It is now possible to provide at the output of the capacitor-storage device an arrangement which, upon appearance of a target impulse, not only performs a reading of the counter position of the reading-impulse distributor ($s$), and of the amplitude of the impulse, but also of the momentary angular position ($\vartheta$) of the radar antenna, for example, with the aid of a servo system incorporating an encoding disk, which reading is performed in a digital fashion. This data is then fed to a computer.

If the original target point is not exactly at the distance assigned to a certain capacitor, then a portion of the reflected energy will also reach the neighboring or adjoining capacitor. By means of the charging relation in both capacitors the $s$-coordinate of the target point is capable of being finely corrected ($s'$). To this end an electronic computing arrangement has to be provided, adapted to solve the following equation:

$$s'=\frac{s \cdot s_1 + r \cdot s_2}{s+r} - \frac{s_2 - s_1}{2} = s_2 - \left(\frac{s}{s+r}+\frac{1}{2}\right)\Delta s$$

In this equation $s$ and $r$ indicate the amplitude values of the two radially adjoining target points at the distances $s_1$ and $s_2$.

Of course, the same possibility of correction will also result with respect to the $\vartheta$-coordinate, whenever the target energy appears in successively following readout-scanning periods, provided that the scanning period exactly corresponds to the time which is required by the antenna lobe to perform its sweep. To this end the storage unit of the computing circuit associated with the incoming distance element has to be called up (read). This element contains the data regarding both the amplitude and the target with respect to the preceding scanning period. Together with the target amplitudes, the two $\vartheta$-coordinates can now be evaluated in accordance with the following formula in a corresponding electronic computer, in other words, they can be finely corrected:

$$\vartheta'=\frac{u \cdot \vartheta_1 + v \cdot \vartheta_2}{1+v} - \frac{\vartheta_2 - \vartheta_1}{2} = \vartheta_2 - \left(\frac{u}{u+v}+\frac{1}{2}\right)\Delta\vartheta$$

In this equation $u$ and $v$ indicate the amplitude values of the two tangentially neighboring target points at the angles $\vartheta_1$ and $\vartheta_2$.

For improving the angular coordinates ($\vartheta$) the video signal, which is compressed with respect to the frequency band, is first fed directly, and thereupon via a time-delay circuit 125 (delayed by one reading cycle) to an adder 126. In this way the target amplitudes which, in some instances, may be distributed to two neighboring capacitors, are combined.

The computer circuit 127 receives this signal $u$, as well as the signal $v$, which is delayed by one reading cycle or period with the aid of a storage arrangement 128 and a delay circuit 210, after having been subjected to a digital conversion in the converters 129 and 130 respectively.

Subsequently to the multiplication with an angular element $\Delta\vartheta$ (half beam power) in the adder 131, the result of the computing operation is fed to the momentary antenna angle $\vartheta$ as a correcting quantity in the adder 132. The antenna angle is obtained from the tone wheel generator 122 via a 3600:1-frequency divider 133 with a resetting portion. The associated distance coordinate results in the same manner from the position of the counter 134. Associating coordinates are applied simultaneously to the input-gating circuit 135 of a buffer storage 136.

In an almost ideal way the amount of information capable of being processed is only restricted by the available transmission lines, the bandwidths of which have a limiting effect upon the transmission velocity with respect to the ascertained target coordinates. In order to adapt the high-speed computer to the low-transmission speed of the lines, a buffer storage is required in which the storing or writing is rapidly, but irregularly effected by the computer, and from which the data is readout towards the transmission line slowly, but regularly. The transmission bandwidth required thereby depends on the maximum possible number of targets, and on the duration of the antenna rotation, while the capacity of the buffer storage is determined by the distribution of the targets over the visual range of radar apparatus.

The fine coordinates ($\vartheta'$) as ascertained by the computing system 125 to 131 are now applied, without an amplitude data, and after checking "whether a sufficient number of target impulses had been available," via the gating circuit 135 controlled thereby and by other criterions, to the buffer storage 136 in order to perform the subsequent transmission of the data to the distant central station.

With the aid of the above mentioned blocking circuit it is also possible, with the aid of simple additional arrangements, to exclude large permanent or fixed target or echo complexes automatically from being transferred (criterion e.g. "more than three directly neighboring target points"). The gating circuit 135 is controlled by various criterions: via the gating circuit 137 by the momentary amplitude, and via the gating circuit 138 by all of the amplitudes of the target. If three and more capacitors contain a target charge, then this often indicates a larger target complex, which is not supposed to be transmitted. Furthermore, it shall be possible to fade-out certain coordinate ranges. This can be effected via the correspondingly controlled multiple gating circuit 139. Only when complying simultaneously with all criterions the target is worthy of being transmitted, and the writing (or storing) into the buffer storage 136 is released via a coincidence circuit 140. The controlling of the buffer storage is effected via a writing-pulse generator 141, and via a reading-pulse generator 142 which is separated from the first generator, and whose rhythm or cycle is adapted via a further shifting generator 143 to the transmission speed over the long-distance line.

The capacity of the buffer storage 136 amounts to about 1000 pairs of coordinates of respectively 35 bits. For the storing and the long distance transmission a decimal code is provided, by which each decimal point is encoded in itself in a binary fashion. Accordingly, for the distance coordinate three decimal points are required, and four decimal points for the azimuth. The binary encoding of the digits 0 to 9 is effected either in the "2 out of 5"-code capable of being tested, or in the binary code with 4 bits. In the latter case a remainder of 7 bits per target remains in the buffer storage, which is then used for receiving additional signals.

Since the present case deals with an information flow which is quasi-periodical with respect to the antenna rotation, and since further means for the recognition of faults or interferences are provided at the large central computer system, it is admissible to perform the transmission with the aid of a code which is not capable of being tested, so that in this way the transmission capacity of the long-distance transmission line can be better utilized. Via 35 output amplifiers 144 (35 bits) the associated coordinate values are transmitted to the output flip-flop circuits 145 which are designed as shift registers, and are fed from there, by the addition of a synchronizing signal, to the carrier-frequency converter 146. A similar converter arrangement 147 processes the signal for the radar-picture transmission, as well as the rotation signal required to this end, which is processed in the converter 148. Via three similar kinds of lines, which may be cyclically permuted with one another for auxiliary purposes, both signals arrive at the central station where they are fed, after having been demodulated in the demodulators 149 and 150 respectively via the regenerating arrangement 151 to the large computing system 153 and to the slave-PPI 154 respectively after the signals have been separated by the separator 152. An alternating-current telegraph channel comprising the transmit-receivers 156, 157 and the converter 158, 159 is used as an auxiliary line, via which at the same time, and with the aid of the circuit arrangement 160 and 139, the selection of ranges to be faded out $(s_0, s_0)$ is controlled.

In the case of severe interferences of the radar image the transmission capacity of one carrier-frequency channel is no longer sufficient. In order to make possible the coordinate transmission to the central station in this case, it appears to be suitable to apply the following methods:

(a) Reduction of the accuracy to 1% or respectively 1° in the distance and the azimuth respectively (this corresponds to about 23 digital positions to be transmitted), in that the respectively last decimal points of positions and the additional signals in the buffer storage 136 are no longer interrogated. By this measure it is possible to increase the transmission capacity by the factor 1.5.

(b) Distribution of the target coordinates to several parallel-extending lines or channels respectively of the same type in the course of the time-division multiplex method. To this end, however, it is necessary to perform a switchover of the lines and of the duty cycle in the buffer storage, as well as to insert several parallel output stages in the buffer storage.

(c) The blanking of the areas with particularly great number of disturbances or fixed target $(s_0, \vartheta_0)$. This blanking may be either firmly adjustable, or—as already mentioned—designed to be capable of being remotely controlled via the alternating-current telegraph channel 156 to 159, and the circuit arrangements 160 and 139.

All of these arrangements, whose initiation can be made dependent upon, for example, a certain charging or storing condition of the buffer storage, are only supposed to be maintained until the amount of information accumulated in the buffer storage has been processed, respectively until the delivered amount of information has decreased to an extent at which a continuous transmission is enabled.

Figure 12:
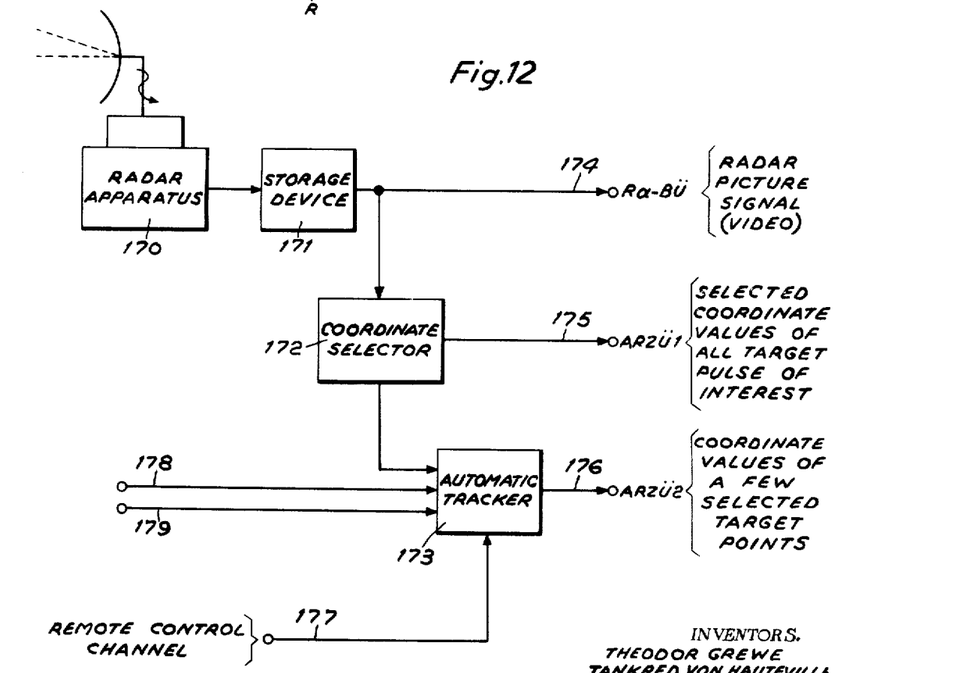
FIG. 12 shows the simplified block diagram of a system according to the invention for simultaneously transmitting three signals to the "slave" monitor (slave-PPI instrument), or to the evaluating equipments.

FIG. 12 shows the block diagram of an enlarged system for seizing the coordinates and for transmitting all target points appearing in the radar-picture signal. In the following discussion and also with reference to FIGURE 12 the abbreviation RaBÜ refers to video signals which are used for the radar picture transmission as shown over line 174 and the expression ARZÜ refers to signals which are used for automatic radar target control and are transmitted over lines 175 and 176. The video signal coming from the radar apparatus 170 is fed to the capacitor storage device 171. After bandwidth compression and noise suppression the signal is transmitted from the output of the storage device with a maximum speed of 15,000 targets per second over the line 174. From the output signal of the capacitor-storage device 171, in the arrangement 172, and in the manner described with reference to FIG. 9 hereinbefore, the coordinate values of the existing targets are derived, and transmitted over the transmission line 175 at a speed of 150 targets per second to the slave station (automatic radar target control ARZÜ). As opposed to the arrangement according to FIG. 9, the described system additionally still comprises an arrangement 173 for performing a continuous automatic tracking of a certain number of target points, for example 100. This arrangement 173, to which the signal ARZÜ1 is fed, which is simultaneously transmitted over the line 175, consists of a corresponding number of "target-tracking loops." Each of these individual target-tracking loops consists in the conventional manner of a gating circuit, which is only unblocked in the neighborhood of the target position to be expected, and of an arrangement for seizing the coordinates of the target point appearing during this period of time. These coordinate values are stored, and by way of an extrapolation, based on the measured speed of the target and any additional values, the assumed new target position is computed, and this setting is then transferred to the aforementioned gating circuit, so that the latter again becomes unblocked in the direct neighborhood of the target to be contacted, and in the course of the next successive scanning operation. Since the target-tracking loops 173 are arranged after the arrangement serving the contacting or seizing of the coordinates 172, the seized coordinate values (ARZÜ1-signal) can be utilized as well for the target-tracking purpose. A gating circuit arranged in front of the individual target-tracking loops is controlled, subsequently to the conversion of the coordinate pairs from polar coordinates $(s, \vartheta)$ into rectangular coordinates $(xy)$, by a coincidence arrangement to which the momentarily applied coordinates from the radar apparatus, as well as the extrapolated (precalculated) target coordinates are applied. The extrapolation of the new target coordinates is effected in the conventional manner in the course of the analog computing method with the aid of one control amplifier for each coordinate, or else by a digital computing method employing a computer provided with storage devices.

Since the target-tracking loop 173, over the lines 178, 179, and also over further lines, can be supplied by several radar apparatus, the ranges of which overlap each other, and because, therefore, both the recognition and the tracking either in blind areas or disturbed zones can be performed substantially more easily and exactly from the central station. A special remote control channel 177 is provided for effecting both the setting and the continuous checking (controlling) of the target triggering loop by the central computer. At the outputs of the target-tracking loops 173 the target position are cyclically interrogated, and are transmitted over the channel 176 with a maximum speed of 15 targets per second to the central station. If the ARZU1-channel is disturbed, for example, due to an overcrowded buffer storage, then at least the most important targets as computed or selected by the computer, are transmitted. Various possibilities exist for transmitting the time position at which the target has been contracted. Thus, for example, the time position can be transmitted like a distance data together with the target coordinates. Furthermore, it is possible to utilize the antenna-rotation channel of the radar-picture signal (RaBÜ) as compressed by the storage device 172. To this end it is necessary to ascertain the time position at which certain angular values appear, so that the assignment of the angular coordinates transmitted over the data channel to certain time positions is possible. Since the distance-time positions have to be exact to about 0.1 second, and because the period of the antenna rotation amounts to 2 to 20 seconds, it is possible to transmit 20 to 200 angular time assignments per second. Finally, the north mark and, in some cases, further angular marks can be transmitted over the data channel 146, 150 in FIG. 9 by bypassing the buffer storage 136, while at the same time in the central computer a "clock," that is, an electronic counting chain is synchronized, which then determines the angular-time respond.

In case one target goes astray (for example, because several target points appear during the opening time of the gating circuit and thus irritate the target-tracking device), the target-tracking device automatically indicates this fact, via the supervisory channel, to the central computing ssytem which then, with the aid of the available information of other radar apparatus, direction finders, air-flight charts, etc., takes over the further control of the target-tracking device of the radar apparatus via the remote-control channel until a complete unambiguity has been reestablished.

Accordingly, the following is transmitted by the radar apparatus to the cental evaluation station:

(1) The RaBÜ-signal, that is, the entire information in an analog form, including all non-operative times, fixed target complexes, etc.

(2) The ARZÜ1-signal, that is, the coordinate values of all received target impulses which cannot be excluded clearly as being of no interest.

(3) The ARZÜ2-signal, that is the coordinate values of a few target points (e.g. 100), which are selected by the central station.

After the conversion, the RaBU-signal serves in a slave-PPI instrument to visually supervise the entire air space. The ARZÜ1-signal serves as the input signal for the central computing system and, simultaneously, as the input signal for the target-tracking arrangement 173, from which the ARZÜ2-signal may then be taken which results in a continuous flight-path tracking for some of the selected targets.

The inventive types of arrangements as described herein may be fully transistorized. In this way they become relatively small, easy, and robust to handle, and have an almost unlimited service lifetime.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A system for noise suppression, bandwidth compression and evaluation of radar pulse-type signals for transmission over channels of smaller bandwidth comprising a radar transmitter including a rotating antenna for transmitting radar pulses, a radar receiver including said rotating antenna for receiving echoes of said radar pulses and for providing said pulse-type signals, a plurality of storage elements, each said storage element representing a discrete quantity, the number of said storage elements being limited in accordance with the probability of accuracy of the evaluation, a write-in pulse distributor, a plurality of gating means, means coupling said pulse-type signals and the output of said pulse distribtuor to said plurality of gating means, means coupling the output of said gating means to said storage elements whereby said pulse-type signals are sequentially written in to said storage elements at a first frequency determined by said pulse distributor and means to read out said stored signals from said storage elements at a second frequency.

2. A system according to claim 1 wherein said storage elements are electrostatic storage elements and the writing in of said signals on said storage elements is effected in a high impedance manner and the reading out is effected in a low impedance manner.

3. A system according to claim 2 wherein said electrostatic storage elements are storage capacitors and further comprising first and second rectifiers, means coupling one electrode of each storage capacitor to said first and second rectifier with different polarities whereby said storage capacitor is charged and discharged respectively, and means coupling the other electrode of each said storage capacitor to the writing pulse distributor whereby said capacitor is charged by a pulse from said distributor.

4. A system according to claim 3 wherein said first and second rectifiers consist of a series connection of a germanium diode and a silicon diode.

5. A system according to claim 3 wherein the pulses coupled to the storage capacitors by said pulse distributor are formed of two trains of pulses in a coincident circuit, said coincident circuit comprising two parallel-connected biased rectifiers, and transistor means coupling said rectifiers to said storage capacitors.

6. A system according to claim 3 wherein the charging pulses coupled to the storage capacitors by the pulse distributor comprise two trains of pulses in a coincidence circuit, said coincidence circuit comprising a series connection of a biased diode and a transformer.

7. A system according to claim 1 further comprising a second plurality of gating circuits equivalent to the number of storage elements, a reading pulse distributor, and means coupling said storage elements and the output of said reading pulse distributor to said second plurality of gating circuits.

8. A system according to claim 7 wherein the plurality of gating means for writing in the pulse-type signals are controlled by the writing pulse distributor, and further comprising a writing pulse clock, the frequency of which is synchronized by said radar pulses.

9. A system according to claim 8 wherein said clock is triggered by said transmission pulse and is stopped as soon as the writing pulse distributor has reached a desired position and further comprises means to reset said writing pulse distributor to its initial position.

10. A system according to claim 8 further comprising a reading pulse clock coupled to said reading pulse distributor to control the frequency thereof, said clock generating a train of pulses during a readout period, the first pulse of said train of pulses constituting a synchronizing pulse and means for adjusting the frequency of said reading pulse distributor.

11. A system according to claim 10 wherein the clock coupled to the reading pulse distributor is synchronized by the antenna rotation whereby each synchronizing pulse transmitted at the beginning of each readout period corresponds to the progress of the antenna rotation by a defined angle.

12. A system according to claim 11 wherein the clock controlling the reading pulse distributor is started by a signal derived from the antenna rotation and is stopped again after reading the last storage element.

13. A system according to claim 10 further including means to fade at least one pulse into the pulse-type signals to be transmitted, said pulse marking a suppressed area in the event that the clock for the reading pulse distributor is stopped prior to readout from a storage element.

14. A system according to claim 10 further including means to change the frequency of the clock coupled to the reading pulse distributor to a lower frequency as soon as a signal voltage appears at the output of a storage element.

15. A system according to claim 10 further comprising means to derive a signal proportional to the antenna rotation of said radar transmitter, a receiver to receive said pulse type signals over the channels of smaller bandwidth, a plan position indicator coupled to said receiver, means to transmit said signal proportional to said antenna rotation over the channels of smaller bandwidth, said receiver including means to demodulate antenna rotation signals and an auxiliary generator, and means synchronizing the frequecy of said auxiliary generator to said reading pulse clock.

16. A system according to claim 15 further comprising means for synchronizing the reading pulse clock to the write-in pulse clock in a fixed phase relation.

17. A system according to claim 16 further comprising a frequency divider having the ratio $n:1$, means coupling the output of said write-in clock to said frequency divider, gating means coupling the output of said frequency divider to said reading pulse distributor and means coupling a stop pulse to said reading pulse distributor for resetting said reading pulse distributor to zero, and phase comparing means for comparing said stop pulse with the $n$th pulse of said auxiliary generator to synchronously adjust said auxiliary generator.

18. A system according to claim 15 further comprising means to fade a pulse into the video signals transmitted over said smaller bandwidth channels at each stoppage of the reading pulse clock wherein said auxiliary generator is readjusted by said pulse each time one $n$th pulse (where $n$ equals the number of storage elements) is synchronized in a fixed phase relation with said pulse.

19. A system according to claim 18 further comprising means to delay transmission of said pulse signals over said small bandwidth channels, and means at said receiver to compare said pulse signals with the preceding and following signals to control the amplitude of said signals.

20. A system according to claim 8 wherein each said storage element represents a single value and further comprising phase comparison means, means coupling a signal from a desired storage element and a radar signal indicative of a target at a range corresponding with the range value of said storage elements to said phase comparator and means responsive to the output of said phase comparison means to readjust the frequency of said pulse distributor.

21. A system according to claim 1 further comprising a switching device disposed in parallel with the input to the storage elements for short circuiting the pulse-type signals during the time interval between the inputs to two consecutive storage elements.

22. A system according ot claim 21 wherein the frequency of the writing pulse distributor is controlled by a crystal stabilized clock whose frequency is a multiple of the transmission pulse frequency of the radar pulses.

23. A system according to claim 1 further comprising a second plurality of storage elements, means coupling each of said second plurality of storage elements to a corresponding one of said first plurality of storage elements and means to discharge the information from said first plurality of storage elements to said second plurality of storage elements after the writing in of a certain number of pulse-type signals and means to readout said information continuously from said second plurality of storage elements.

24. A system according to claim 1 further comprising means to recombine said pulse-type signals after being read out from said storage elements, a pulse amplitude modulation demodulator and means coupling said recombined signals to said demodulator.

25. A system according to claim 1 further comprising a pulse amplitude modulation to pulse width modulation converter, means coupling the signal read out from said storage elements to said converter and means coupling the output of said converter to means for transmission over channels of smaller bandwidth.

26. A system according to claim 1 further comprising means to derive a signal proportional to the antenna rotation of said radar transmitter, a receiver to receive said pulse type signals over channels of smaller bandwidth, a plan position indicator coupled to said receiver, means to transmit said signal proportional to said antenna rotation over said channels of smaller bandwidth and means in said receiver to demodulate said antenna rotation signals.

27. A system according to claim 1 further comprising means to evaluate a target pulse appearing in any of said storage elements for its value as a distance coordinate and means to transmit said distance coordinate pulse, and further comprising means to evaluate the amplitude of said target pulse with respect to the amplitude of a preceding distance pulse or with a pulse representing the angular information of said target and means for recording the angular coordinate of said target and for transmitting said angular coordinate information.

28. A system according to claim 27 further comprising a counting circuit for encoding said information, a pulse generator, a servo system coupling said pulse generator to said rotating antenna and whereby said counting circuit is controlled by said pulse generator.

29. A system according to claim 28 further comprising means coupled to said antenna rotation to derive the angular coordinate of a target, means to distribute said angular coordinate information to two or more storage elements in addition to the corresponding amplitude values thereof, and means to couple said angular coordinate information together with said amplitude value to computing means to derive a fine angular coordinate information from the relation of said amplitude to said angular coordinate information.

30. A system according to claim 27 comprising means to determine the difference distance from a target to a preceding target and means to transmit said difference distance as soon as said difference distance exceeds a predetermined maximum.

References Cited by the Examiner

UNITED STATES PATENTS

| 2,412,670 | 12/46 | Epstein | 343—11 |
|---|---|---|---|
| 2,472,535 | 6/49 | Jones | 343—6 |
| 2,508,408 | 5/50 | Liebson | 343—17.1 |
| 2,519,935 | 8/50 | Smith et al. | 343—6 |
| 2,534,837 | 10/50 | Russell et al. | 343—17.1 |
| 2,698,931 | 1/55 | Van Voorhis | 343—6 |
| 2,776,369 | 1/57 | Woodcock | 343—17.1 |
| 2,782,412 | 2/57 | Brockner | 343—17.1 |
| 2,897,490 | 7/59 | Sunstein | 343—17.1 |
| 2,956,274 | 10/60 | Smythe | 343—11 |

CHESTER L. JUSTUS, *Primary Examiner.*

KATHLEEN H. CLAFFY, *Examiner.*